US008558414B2

(12) United States Patent  
Warren et al.

(10) Patent No.: US 8,558,414 B2  
(45) Date of Patent: Oct. 15, 2013

(54) VOLTAGE REGULATOR FOR MERCHANDISE DISPLAY SECURITY DEVICE

(75) Inventors: William M. Warren, Fort Mill, SC (US); David P. Christianson, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 558 days.

(21) Appl. No.: 12/854,246

(22) Filed: Aug. 11, 2010

(65) Prior Publication Data

US 2012/0038342 A1     Feb. 16, 2012

(51) Int. Cl.  
    *G01R 1/20*     (2006.01)
(52) U.S. Cl.  
    USPC ........................................................ 307/154
(58) Field of Classification Search  
    USPC ................. 307/20, 28, 154; 340/568.2, 568.3  
    See application file for complete search history.

(56) References Cited

U.S. PATENT DOCUMENTS

| 5,535,274 A | 7/1996 | Braitberg et al. |
| 6,509,659 B1 | 1/2003 | Carroll et al. |
| 6,756,900 B2 | 6/2004 | Leyden et al. |
| 6,842,114 B2 | 1/2005 | Billiard |
| 7,015,596 B2 | 3/2006 | Pail |
| 7,446,659 B2 | 11/2008 | Marsilio et al. |
| 7,629,895 B2 | 12/2009 | Belden, Jr. et al. |
| 7,710,266 B2 | 5/2010 | Belden, Jr. et al. |
| 7,737,674 B2 | 6/2010 | Erbito, Jr. |
| 7,737,843 B2 | 6/2010 | Belden, Jr. et al. |
| 7,740,214 B2 | 6/2010 | Marsilio et al. |
| 2003/0218550 A1* | 11/2003 | Herrmann ................ 340/870.39 |
| 2007/0152819 A1* | 7/2007 | Marszalek et al. ......... 340/568.4 |
| 2009/0173868 A1 | 7/2009 | Fawcett et al. |

* cited by examiner

*Primary Examiner* — Carlos Amaya  
(74) *Attorney, Agent, or Firm* — InVue Security Products Inc.

(57) ABSTRACT

A voltage regulator for a merchandise display security device provides an appropriate operating voltage through a power cable electrically connected between an alarm sensor and an item of merchandise. The voltage regulator utilizes a feedback signal from a power conversion chip and data from a microprocessor look-up table to adjust the input power to the merchandise. The look-up table stores appropriate operating voltage requirements for each power cable used for different types and brands of merchandise. The type and brand of merchandise is identified by the resistance of the power cable and the feedback signal is modified continuously to maintain power to the merchandise at an appropriate operating voltage.

23 Claims, 3 Drawing Sheets

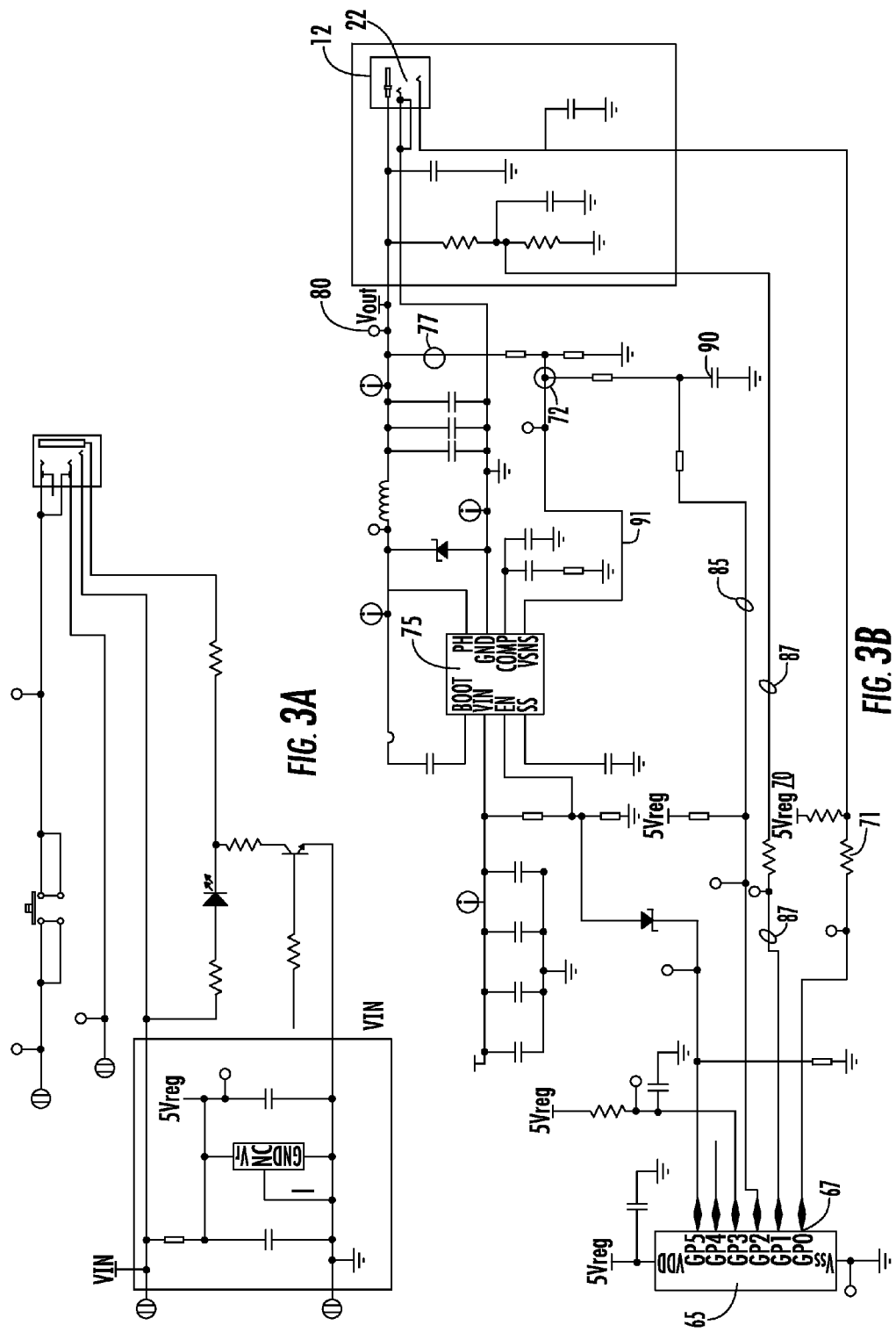

VOLTAGE REGULATOR FOR MERCHANDISE DISPLAY SECURITY DEVICE

FIELD OF THE INVENTION

The present invention relates generally to voltage regulators. More particularly, the invention is a voltage regulator for determining the appropriate operating voltage for an item of merchandise displayed on a merchandise display security device and for providing power to the merchandise, thereby enabling a potential purchaser to examine and operate the merchandise in a powered state.

BACKGROUND OF THE INVENTION

Items of merchandise are often displayed for a potential purchaser to examine, and in some instances, operate the merchandise. For example, retail stores typically provide items of merchandise, particularly relatively expensive handheld electronics, on a display that allows a potential purchaser to examine and operate the merchandise, and thereby learn more about its features, in a powered state. To deter theft of the item of merchandise, retailers typically attach the item of merchandise to a merchandise display security device. The security device, including for example, mechanical tethers, sensors coupled to the merchandise by electrical or optical cables, and wireless monitoring systems, activate an alarm if the item of merchandise is detached from the security device by an unauthorized person, such as a potential shoplifter attempting to remove the merchandise from the display.

Merchandise display security devices are available in a variety of designs to meet both the display and security requirements of different types of merchandise. Conventional security devices include, but are not limited to, modular components that communicate via switching systems, tethered units that communicate with broader security systems, and stand-alone alarm modules having a base and associated sensors that attach to handheld electronics, such as cellular telephones, cameras, video equipment, and the like. Exemplary merchandise display security devices that are commercially available from the assignee of the present invention are shown and described in U.S. Pat. No. 7,740,214, U.S. Pat. No. 7,737,843, U.S. Pat. No. 7,710,266, U.S. Pat. No. 7,629,895, and U.S. Pat. No. 7,446,659, as well as U.S. Patent Application Publication No. 2009/0173868, the entire disclosures of which are incorporated herein by reference.

One of the most important developments in merchandise display security devices has been the provision of power from the security device to the item of merchandise. In this regard, the security device not only protects the item of merchandise from theft, but also allows a potential purchaser to examine and operate the merchandise in a powered state. The potential purchaser is more likely to purchase the item after having had an opportunity to evaluate the various features and capabilities of the merchandise. The security device in this instance serves not only as an alarming system to deter theft, but also as a conduit for providing power to the item of merchandise.

However, a problem arises with a merchandise display security device that provides power to an item of merchandise because the security device and the item of merchandise offered for sale generally have different power, and in particular, voltage requirements. In particular, the electronics of the security device must be provided with power at the proper operating voltage, while at the same time the security device provides power to the item of merchandise at an appropriate operating voltage for the merchandise. Different types of items of merchandise (e.g., cell phones, cameras, MP3 players, video recorders/players, etc.) from various manufacturers, as well as different models of the same type of merchandise from the same manufacturer, utilize customized power circuits that require particular operating currents and operating voltages. In designing a merchandise display security device to provide power to an item of merchandise via an electronic circuit within the security device, many variations are needed because each type, and potentially each model, of the merchandise may have unique power requirements, and in particular, a different operating voltage. Obviously, it is not cost efficient or practical for retailers to purchase, stock and install multiple merchandise display security devices that provide different operating voltages to the different types and models of merchandise to be displayed so that a potential purchaser may examine and operate the merchandise in a powered state.

Instead of providing a different security device for each type and model of an item of merchandise having a different operating voltage, manufacturers have developed security devices that deliver an appropriate operating voltage to more than one type or model of merchandise. For example, a merchandise display security device disclosed in U.S. Pat. No. 7,015,596 issued to Pail provides power to different items of merchandise via a single power cable, also referred to as an "adapter cable" or "power cord", extending between an alarm sensor and the merchandise. The power cable includes a reference resistor and a calibrating voltage of the security device induces a voltage across the reference resistor that is measureable by electronics within the security device. The measured voltage across the reference resistor is one way of identifying the operating voltage associated with the item of merchandise so that the security device can provide an appropriate operating voltage to power the merchandise.

U.S. Pat. No. 6,756,900 issued to Leyden discloses a merchandise display security device including an alarm sensor for the item of merchandise with a movable voltage selector switch having a plurality of positions that allow store personnel to select an appropriate operating voltage to be delivered to the item of merchandise via a suitable power cable. The alarm sensor is configured to provide any one of a plurality of discrete operating voltages to the item of merchandise determined by the position of the voltage selector switch.

U.S. Pat. No. 6,509,659 issued to Carroll discloses yet another merchandise display and security system for delivering an appropriate operating voltage to an item of merchandise displayed on a security device. The system described in the Carroll patent utilizes a power cable having a universal connector end for attaching to an alarm sensor of the security device, and a customized connector end tailored to the power requirements of the item of merchandise being displayed. A pin layout at the customized end determines which pins of the universal connector end are utilized to complete an electrical circuit through the power cable. The completed circuit identifies the appropriate operating voltage that the security device should provide via the power cable to power the item of merchandise on display.

U.S. Pat. No. 5,535,274 issued to Braitberg discloses yet another variation of a power cable extending between a merchandise display security device and an item of merchandise. The power cable described by Braitberg may be configured by a number of pins reserved at the processor (i.e., "common") end of the power cable. The interface at the merchandise end of the power cable provides a communications link that establishes a binary pattern of identification data unique to the item of merchandise to be powered. The security device uses the binary pattern to identify the type and model of merchandise connected to the power cable, and thereby determine the appropriate operating voltage for the merchandise from an associated look-up table.

Accordingly, merchandise display security devices are known that include electronics for identifying an item of merchandise attached to the security device and for delivering an appropriate operating voltage to the merchandise. The known security devices, however, fail to account for system error and component tolerances that could misidentify the merchandise. Such an occurrence could, of course, lead to the security device providing an inappropriate operating voltage to the merchandise, thereby causing serious damage to the merchandise and possibly to the security device. Without limiting the invention in any manner, one object of the invention is to provide a voltage regulator and associated method for determining an appropriate operating voltage for an item of merchandise displayed on a security device and for providing power to the merchandise in a manner that accounts for system error and the tolerances of individual components of the system so that a potential purchaser may examine and operate the merchandise in a powered state.

BRIEF SUMMARY OF THE INVENTION

In a merchandise display security device including a voltage regulator for determining an appropriate operating voltage and for providing power to an item of merchandise attached to the security device, a correction signal digitally encodes a feedback signal from an operating voltage node. The correction signal then correlates the feedback signal to the power requirements of the merchandise. The correction includes encoding the feedback signal via a pulse width modulation signal applied to the feedback loop. The corrected feedback signal is directed to an error correction circuit in a power conversion chip to produce an appropriate operating voltage for the merchandise.

The voltage regulator determines the power requirements for the item of merchandise attached to the merchandise display security device by providing a regulated voltage across an identifying resistor of a power cable extending between the security device and the merchandise. The resistance of the identifying resistor correlates to one of a plurality of operating voltages stored in a look-up table of a microcontroller. The voltage regulator accesses the look-up table to determine the appropriate operating voltage to be provided to the item of merchandise via the power cable so that a potential purchaser may examine and operate the merchandise in a powered state.

BRIEF DESCRIPTION OF THE DRAWINGS

FIG. 3A is a schematic of an electronic circuit for providing a known input voltage to a voltage regulator circuit of the merchandise display security device of FIG. 1.

FIG. 3B is a schematic of an electronic circuit for the voltage regulator of the merchandise display security device of FIG. 1 including a correction signal for encoding a feedback signal using pulse width modulation.

DETAILED DESCRIPTION OF EXEMPLARY EMBODIMENTS OF THE INVENTION

Figure 1:
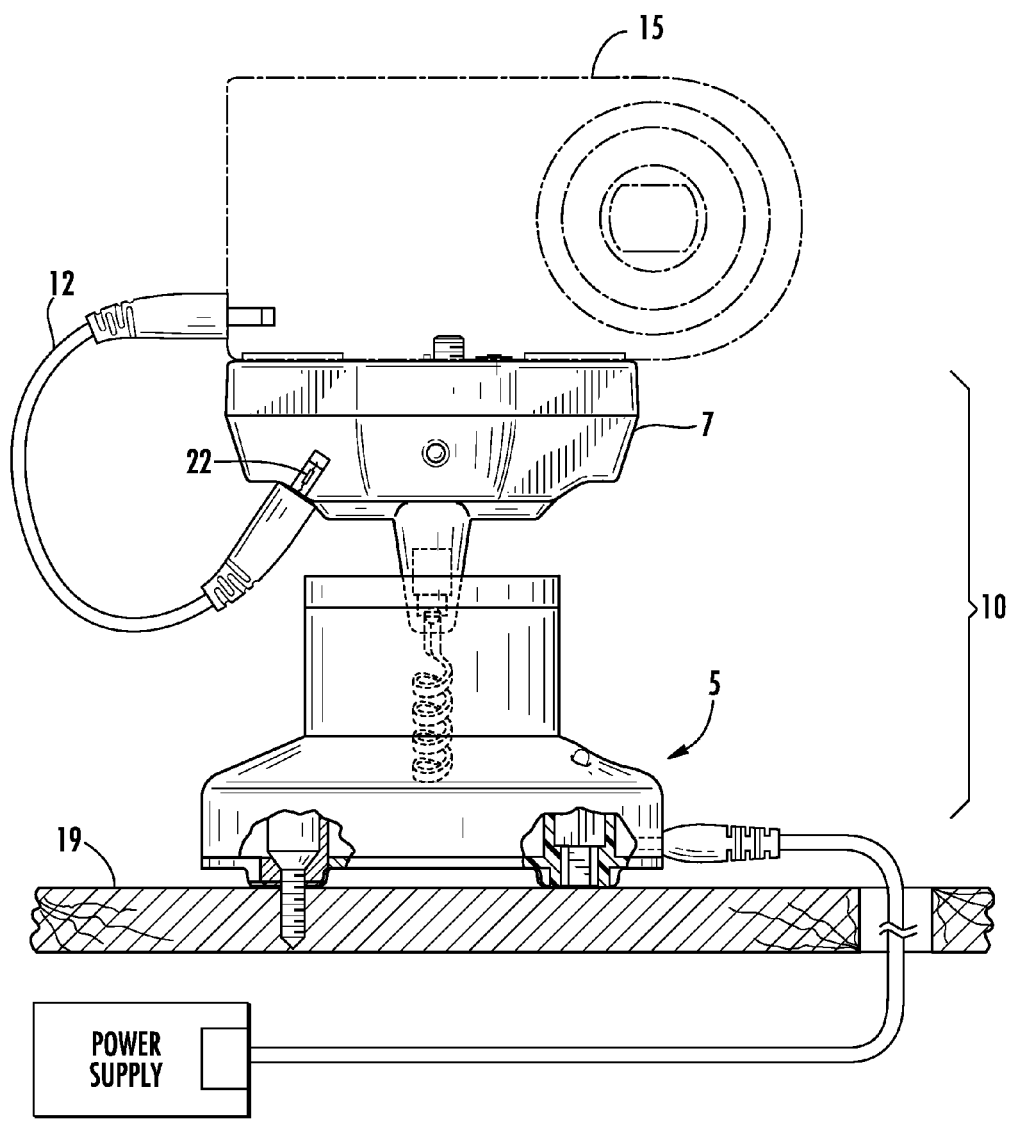
FIG. 1 is an elevation view of a merchandise display security device including a voltage regulator according to the present invention for determining an appropriate operating voltage for an item of merchandise attached to the security device and for providing power to the merchandise via a power cable.

The present invention relates to a voltage regulator for a merchandise display security device 10 and an associated method for determining the appropriate operating voltage for an item of merchandise 15 attached to the security device 10. The voltage regulator described herein provides an appropriate operating voltage for powering the item of merchandise 15 through a power cable 12 extending between the security device 10 and the displayed merchandise. The merchandise display security device 10, the voltage regulator circuit, and the voltage regulating method described herein address the problems of system error and component tolerances to provide only an operating voltage that is appropriate for the item of merchandise 15 being displayed on the security device 10. In one embodiment, the security device 10 provides discrete operating voltages that match the operating voltage requirements of the item of merchandise 15 identified by the voltage regulator. The method of the security device 10 includes an error check that prevents unusual system variances that can cause an incorrect operating voltage to be delivered to the item of merchandise 15. In one embodiment, the error checking tool of this invention maintains a proper voltage from a power conversion chip 75 (FIG. 3B) that supplies the operating voltage to the item of merchandise 15. When input signals to the power conversion chip 75 would result in an operating voltage that is outside the known acceptable range for the attached item of merchandise 15, the voltage regulator intercedes and provides no voltage to the merchandise. The security device 10 and method of the present invention prevent the transmission of erroneous operating voltages to the item of merchandise 15 by monitoring and correcting a feedback signal measured from an operating voltage node 80 (FIG. 3B) in the circuitry of the security device 10.

FIG. 1 shows an exemplary embodiment of a merchandise display security device 10 that benefits from operating voltage feedback and error checking utilizing a voltage regulator as described herein. The security device 10 shown in FIG. 1 is described in detail in U.S. patent application Ser. No. 12/687,370, filed on Jan. 14, 2010, by the assignee of the present invention, the disclosure of which is incorporated herein by reference in its entirety. As such, the details regarding the structure of the security device 10 are not repeated, except to note that the security device 10 includes a base 5 for removably supporting an alarm sensor 7 that secures an item of merchandise 15 attached to the alarm sensor on a display surface 19. The alarm sensor 7 includes a power cable 12 extending from the alarm sensor to the item of merchandise 15. The power cable 12 transmits an operating voltage from power circuitry in the alarm sensor 7 to the item of merchandise 15, allowing an individual to examine and operate the merchandise in a powered state without removing the merchandise from the security device 10. Different kinds of merchandise and various product manufacturers have particular power requirements that utilize particular connectors for attachment to the power supply. In this sense, the power cables 12 currently utilized with conventional security devices are neither generic nor necessarily interchangeable among products. Accordingly, the power cable 12 extending from the alarm sensor 7 to the item of merchandise 15 provides key information for determining the type of merchandise that is attached to the alarm sensor. By identifying the power cable 12 in use with the displayed item of merchandise 15, the alarm sensor 7 can provide an appropriate operating voltage tailored for the particular merchandise.

In one embodiment, the power cable 12 of the merchandise display security device 10 includes an identifying resistor 22 therein. The identifying resistor 22 is electrically connected to an input operating voltage from the alarm sensor 7 and provides power to the item of merchandise 15 accordingly. An exemplary electronic circuit for providing a known input voltage to the identifying resistor 22 is shown in FIG. 3A. The digitally controlled voltage regulating system described herein utilizes the identifying resistor 22 to determine the power cable 12 in use and the corresponding operating voltage requirements needed to maintain the attached item of merchandise 15 in a powered state. Thus, the name "identifying resistor" is used in its general sense to indicate that the resistance in the power cable 12 is indicative of the particular type of power cable in use and the operating voltage (i.e., the output from the power conversion chip 75) that should be maintained for the item of merchandise 15 attached to the alarm sensor 7.

The input resistance of the power cable 12 is one starting point in providing appropriate operating voltage to the item of merchandise 15. This disclosure refers to the input resistance of the power cable 12 in terms of its identifying resistor 22, but such identifying resistor is not intended to be limiting in any manner of the circuit components that can be used in any given power cable. Furthermore, determining the resistance value of the identifying resistor 22 may be accomplished by numerous methods. One embodiment of the security device 10 described herein utilizes a source reference voltage 70 (FIG. 3B) that is maintained by the electronic circuit shown in FIG. 3A and a reference resistor 71 (FIG. 3B) to determine the resistance value of identifying resistor 22. The reference voltage 70 is in electronic communication with both the identifying resistor 22 of the power cable 12 and the reference resistor 71 that is part of the voltage regulator circuit in the alarm sensor 7. The reference voltage 70 induces voltage drops across both the identifying resistor 22 and the reference resistor 71. Given that the reference voltage 70 and the reference resistor 71 values are known, one can measure the voltage drop across the identifying resistor 22, solve a single equation for resistance and voltage, and determine the resistance value of the identifying resistor 22. As noted above, the resistance value of the identifying resistor 22 sets the stage for providing an appropriate operating voltage for the item of merchandise 15 being displayed, monitored and powered by a security device 10 with voltage regulation.

Referring again to FIG. 1, the alarm sensor 7 includes circuitry for calculating and sending appropriate output power to the item of merchandise 15 displayed on the security device 10. With reference voltage 70 included as described above, a microprocessor 65 measures the voltage drop across the identifying resistor 22 and calculates a resistance value of the identifying resistor. The resistance of the identifying resistor 22 provides a reference point allowing the microprocessor 65 to determine the particular type of power cable 12 connecting the alarm sensor 7 of the security device 10 to the item of merchandise 15, and in turn, the voltage requirements for powering the merchandise. The microprocessor 65 stores a first look-up table of resistor values and associated operating voltages to be provided for respective values of the identifying resistors 22. The first look-up table is stored in a computer readable storage medium and is accessible for electronic communication to other components of the voltage regulator circuit. Table 1 illustrates one example of such a look-up table for determining the operating voltage requirements of the item of merchandise 15 that is attached to a security device 10 having a power cable 12 that includes the respective identifying resistor 22.

TABLE 1

| Reference | Identifying Resistor Value in Ohms | Operating voltage |
| --- | --- | --- |
| R1 | 348 | 3.2 V |
| R2 | 1.54K | 4.2 V |
| R3 | 3.01K | 5.0 V |
| R4 | 4.99K | 6.0 V |
| R5 | 7.68K | 7.9 V |
| R6 | 11.3K | 8.4 V |
| R7 | 17.4K | 9 V |

As noted, the resistor value in the power cable 12 identifies the power cable and directs the voltage regulator to the set point for the proper operating voltage according to the above look-up table. Power conversion chip 75 is in electronic communication with the microprocessor 65 and provides an operating voltage to the power cable 12 in accordance with the values determined by the look-up table. The microprocessor 65 may be programmed to allow only discrete operating voltage signals from the power conversion chip 75 so that any erroneous values for the identifying resistor 22 cannot lead to unduly large and damaging operating voltages being supplied to the item of merchandise 15. The security device 10, therefore, includes a voltage regulator that allows the security device to provide input power to an item of merchandise 15 with system checks to prevent erroneous operating voltages from damaging the merchandise.

Figure 2:
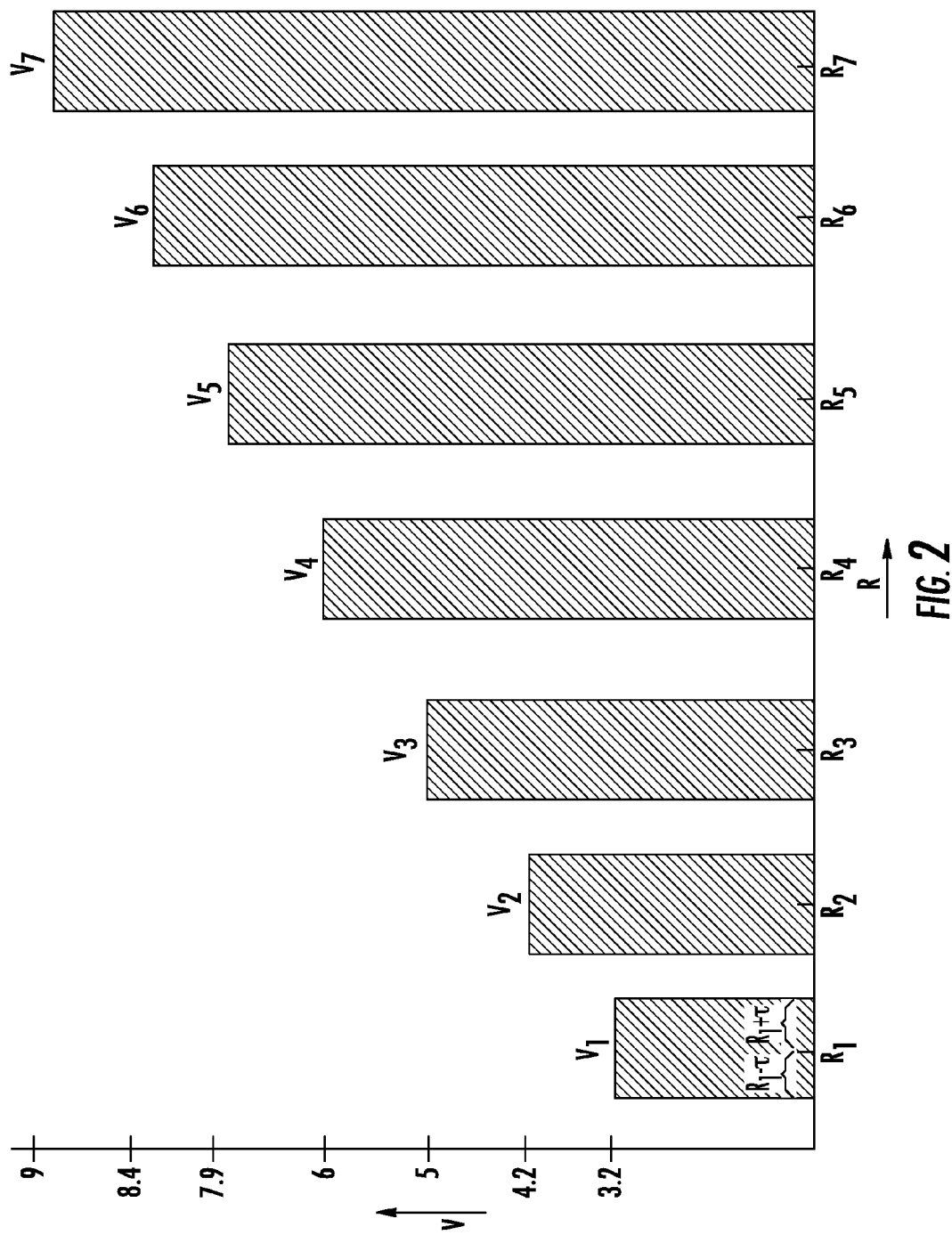
FIG. 2 is a graph of predetermined resistance values associated with operating voltages controlled by the voltage regulator of the merchandise display security device of FIG. 1.

FIG. 2 shows an example of how the look-up table can be used to ensure delivery of an appropriate operating voltage to the merchandise 15. Each resistance value R1 to R7 has a corresponding operating voltage that should be produced by the power conversion chip 75 for the particular power cable 12 identified by its identifying resistor 22. The identifying resistors 22 in the power cables 12 all have specified tolerances (τ) that should be accounted for in the voltage regulator. As depicted in FIG. 2, when the microprocessor 65 detects an identifying resistor 22 having a value between (R−τ) and (R+τ), the microprocessor 65 assigns a discrete operating voltage V to the power cable 12 for all resistance values within the predetermined range. Any resistance value outside the predetermined range results in an operating voltage of zero (i.e., the security device 10 does not provide power to the attached item of merchandise 15) to avoid any damage due to noise or other aberrations in the circuit. Given that the voltage regulator of the security device 10 monitors the proper operating voltage delivered to the item of merchandise 15 by a feedback loop once the voltage regulator identifies the resistor in the power cable 12, voltages outside the assigned value also result in an operating voltage of zero to preserve the integrity of the item of merchandise 15. Therefore, the voltage regulator of the security device 10 described herein is characterized in part by the ability to ensure that either a correct operating voltage or no operating voltage is supplied to the item of merchandise 15 attached to the alarm sensor 7.

The voltage regulator described herein may utilize a modified feedback loop to ensure compliance with certain requirements of the item of merchandise 15. The voltage regulator of the security device 10 continuously monitors the operating voltage from an operating voltage node 80, as shown in FIG. 3B. In fact, a first feedback signal 77 from the power cable 12 back to the power conversion chip 75 provides a source of signal processing that improves the accuracy and consistency of the operating voltage.

Overall, the electronic circuit for providing a known input voltage and the voltage regulator circuit shown in FIG. 3A and FIG. 3B, respectively, uses feedback signal correction techniques to modify the first feedback signal 77 and adjust the output of the power conversion chip 75 accordingly. The output of the power conversion chip 75 is the operating voltage that is delivered to the item of merchandise 15. The feedback signal 77 transmitted from the operating voltage node 80 back to the power conversion chip 75 is instrumental in determining that the correct operating voltage is delivered to the item of merchandise 15. The feedback signal 77 ultimately serves as an input to an error circuit in the power conversion chip 75. When the feedback signal 77 is too large, the power conversion chip 75 modulates the operating voltage downward; when the feedback signal 77 is too small, the operating voltage is increased. The voltage regulator thereby maintains the operating voltage in the appropriate operating range for the item of merchandise 15, as determined by the identifying resistor 22. The feedback loop between the operating voltage node 80 and the power conversion chip 75 maintains the operating voltage within the voltage range established by the identifying resistor 22 and the known tolerance ($\tau$) for a given resistor depicted in FIG. 2.

As shown in FIG. 3B, a correction signal 85 from the microprocessor 65 provides an error correction component to the first feedback signal 77 and ensures greater accuracy in the overall provision of operating voltage to the item of merchandise 15 via the power cable 12. Given that the correction signal 85 is generated by the microprocessor 65, the microprocessor coordinates the correction signal with the previously determined value of the identifying resistor 22 that determines the desired operating voltage to be supplied to the item of merchandise 15. In other words, the microprocessor 65 is programmed to monitor the operating voltage node 80 from the power conversion chip 75, and to send the value of the operating voltage at the operating voltage node 80 back to the microprocessor 65 on a second feedback signal 87. Upon receiving the second feedback signal 87 that monitors the operating voltage, the microprocessor 65 has all of the data it needs to determine how much to increase or decrease the operating voltage to meet the particular power requirements of the item of merchandise 15.

FIG. 3B illustrates more specifically how the microprocessor 65 and power conversion chip 75 achieve voltage regulation. In one embodiment, the correction signal 85 is a pulse width modulation signal having a duty cycle determined by the desirable operating voltage. In this regard, the electronic circuitry provided on the power conversion chip 75 controls the response of an error correction circuit on the power conversion chip. Therefore, the power conversion chip 75 can be mathematically modeled and programmed to provide a particular operating voltage at node 80 upon application of a respective error correction signal to the error control circuitry on the power conversion chip. Accordingly, for each operating voltage that the voltage regulator is designed to control, a known pulse width modulation signal having a pre-set duty cycle can be determined, as discussed in more detail below. To achieve a desirable operating voltage, therefore, the voltage regulator of the present invention utilizes a known input into error circuitry provided on the power conversion chip 75.

To accomplish proper voltage regulation, the correction signal 85 generated by the microprocessor 65 encodes the first feedback signal 77 with a particular duty cycle that is correlated with the desired output voltage. The first feedback signal 77 is encoded at summation node 72 where the correction signal 85 is applied. In one embodiment, and without limiting the present invention in any manner, the correction signal 85 may be a pulse width modulation signal as discussed above. The pulse width modulation correction signal 85, therefore, essentially turns the feedback signal 77 into a digital feedback signal 91. The digitally encoded feedback signal 91 is provided to an error correction circuit in the power conversion chip 75 at pin VSNS. This feedback signal 91 is directly tied to the value of the identifying resistor 22 and the feedback voltage monitored by the microprocessor 65 on the second feedback signal 87. Accordingly, the operating voltage from the power conversion chip 75 can be maintained by the digitally encoded feedback signal 91 having a pulse width and duty cycle engineered to provide a known output from the error control circuitry provided on the power conversion chip 75.

In the exemplary embodiment illustrated in FIG. 3A and FIG. 3B, the voltage regulator and associated circuitry use the correction signal 85 (e.g., the pulse width modulation signal) from the microprocessor 65 to ensure that the first feedback signal 77 from the operating voltage node 80 provides the best error correction possible in modulating the operating voltage from the power conversion chip 75. In one embodiment of the voltage regulator, the digitally encoded feedback signal 91 connects to an inverting node of an error amplifier (not shown) on the power conversion chip 75. The magnitude of the input at the inverting node of the error amplifier is inversely proportional to the output of the power conversion chip (i.e., the inverting input to the error circuit is inversely proportional to the operating voltage provided by the power conversion chip 75). Accordingly, the greater the magnitude of the inverted input to the error amplifier on the power conversion chip 75, the smaller the output operating voltage. In this regard, the encoded feedback signal 91, having an "on time" set by the pulse width modulation correction signal 85, determines the extent to which the error circuitry modulates the operating voltage output from the power conversion chip 75. It follows, therefore, that the duty cycle of the pulse width modulation signal (i.e., the correction signal 85) is inversely proportional to the magnitude of the output operating voltage. In summary, the duty cycle of the pulse width modulation correction signal 85 determines the "on time" of the encoded feedback signal 91, which in turn is inversely proportional to the magnitude of the operating voltage output from the power conversion chip 75. The correction signal 85, which in this exemplary embodiment is a pulse width modulation signal, is instrumental in setting the output operating voltage and maintaining that operating voltage at the appropriate level.

To ensure that the pulse width modulation signal appropriately correlates to the required operating voltage, the microprocessor 65 sets the duration and frequency of the pulse width modulation correction signal 85 in accordance with a second kind of look-up table stored on the microprocessor 65. This second look-up table correlates the resistance values of the identifying resistor 22 with the desired operating voltage for the power cable 12. The second look-up table further provides the data necessary to set the duty cycle of the pulse width modulation correction signal 85. Upon determining that the identifying resistor 22 in the power cable 12 should have a certain input voltage (i.e., operating voltage), the microprocessor 65 sets a percent change in duty cycle to the pulse width modulation correction signal 85. An example of the second look-up table for this embodiment is shown in the following Table 2.

TABLE 2

| Reference | Correction Signal (PWM) in Percent Duty Cycle Adjustment | Operating voltage |
|---|---|---|
| R1 | 43.4815 | 3.2 V |
| R2 | 37.1769 | 4.2 V |
| R3 | 32.1333 | 5.0 V |
| R4 | 25.8287 | 6.0 V |
| R5 | 13.8501 | 7.9 V |
| R6 | 10.6978 | 8.4 V |
| R7 | 6.9151 | 9 V |

The microprocessor 65 uses the continuously monitored second feedback signal 87 to determine the duty cycle for the pulse width modulation correction signal 85 necessary to maintain the proper operating voltage from the power conversion chip 75.

In the example of Table 2, which is not intended to limit the scope of the present invention in any manner, the pulse width modulation correction signal 85 has a smaller duty cycle adjustment when larger operating voltages are desirable. Smaller operating voltages are paired with larger duty cycle adjustments in the pulse width modulation correction signal 85. This is expected because the duty cycle of the pulse width modulation correction signal 85 is inversely proportional to the output operating voltage from the power conversion chip 75. The schedule of Table 2 allows the operating voltage at node 80 to ramp to higher values for items of merchandise 15 that require greater voltage for proper operation. For example, in operation, when the second feedback signal 87 is a high value transmitted back to the microprocessor 65, and the identifying resistor 22 indicates that a lower operating voltage is desirable, the correction signal 85 (i.e., the pulse width modulation signal) from the microprocessor 65 has a much higher percent duty cycle adjustment. The high duty cycle pulse width modulation correction signal 85 encodes the first feedback signal 77 at summation node 72. In this example, the encoded feedback signal 91 will have increased "on time," and is the input to the error circuitry provided in the power conversion chip 75 at pin VSNS. Without limiting the present invention to any particular embodiment, pin VSNS may be an inverting node of an error amplifier in the power conversion chip 75. Given the high value of the encoded feedback signal 91 at pin VSNS, the power conversion chip 75 sends a reduced operating voltage to the power cable 12 and the item of merchandise 15. In other words, when the inverted adjusted feedback signal 91 presents a larger voltage, the power conversion chip 75 compensates for that large value by maintaining a small output at operating voltage node 80, which is, of course, ultimately the operating voltage for the item of merchandise 15. Conversely, when the adjusted feedback signal 91 has a small pulse width adjustment factor applied, as shown in Table 2, the error circuitry sees the input signal to pin VSNS as a small error and compensates to maintain a larger output at operating voltage node 80. In this manner, the power conversion chip 75 continuously maintains an error correction that corresponds to the proper range of outputs (i.e., operating voltages) for the item of merchandise 15.

The exemplary embodiment of FIG. 3B provides a continuous system of fine tuning the first feedback signal 77 from the operating voltage node 80 back to the power conversion chip 75. A digitally controlled pulse width modulation correction signal 85 corrects the first feedback signal 77 and allows discrete and finite inputs to the error correction circuitry of the power conversion chip 75. These finite values more accurately set the operating voltage to known values and set the output value to zero in situations where the data shows an unexpected relationship between actual voltage to the item of merchandise and the voltage determined by the look-up table in the microprocessor 65.

The exemplary embodiment of FIG. 3B further provides for tight control of the operating voltage by utilizing the resistance value of the identifying resistor 22. To ensure that the resistance value of the power cable 12 is properly calculated, the input power circuitry of FIG. 3A helps ensure the accuracy of the reference voltage 70 and the input voltage Vin for the entire system. FIG. 3A, therefore, illustrates a regulated voltage control circuit to provide a known voltage to system components.

The exemplary embodiment of FIG. 3B also provides enhanced accuracy due to circuitry designed to control the electrostatic discharge in the system. Electrostatic discharge may be controlled in part by the inclusion of capacitor 90 proximate the summation node 72 between the correction signal 85 and the first feedback signal 77.

The foregoing has described various exemplary embodiments of a voltage regulator for a merchandise display security system configured for displaying and powering an item of merchandise, while deterring theft and preventing removal of the merchandise from a display area by an unauthorized person. While exemplary embodiments of the present invention have been described, it will be apparent to those skilled in the art that various modifications thereto can be made without departing from the spirit and scope of the invention. Accordingly, the description of these embodiments of the invention and the best mode for practicing the invention provided herein are for the purpose of illustration only, and not for the purpose of limitation.

That which is claimed is:

1. A voltage regulator for an alarm sensor configured to provide power to an item of merchandise via a power cable having an identifying resistor, the voltage regulator comprising:
    a reference voltage source in electronic communication with the identifying resistor and producing a voltage drop across the identifying resistor;
    a microprocessor measuring the voltage drop across the identifying resistor and calculating a resistance value of the identifying resistor; and
    a power conversion chip in electronic communication with the microprocessor and providing an operating voltage to the power cable;
    wherein a first feedback signal is transmitted from the power cable back to the power conversion chip; and
    wherein a correction signal generated by the microprocessor encodes the first feedback signal to provide power to the item of merchandise according to the resistance value of the identifying resistor.

2. A voltage regulator according to claim 1, further comprising:
    a means for varying the voltage of the first feedback signal in response to the correction signal generated by the microprocessor.

3. A voltage regulator according to claim 2, wherein the means for varying the voltage of the first feedback signal comprises a pulse width modulation signal.

4. A voltage regulator according to claim 3, further comprising a summation node connecting the pulse width modulation signal to the first feedback signal.

5. A voltage regulator according to claim 3, wherein the microprocessor comprises a computer readable medium storing a first look-up table that correlates the resistance value of the identifying resistor in the power cable with an operating voltage requirement of the item of merchandise.

6. A voltage regulator according to claim 5, wherein the microprocessor comprises a computer readable medium storing a second look-up table that correlates the duty cycle of the pulse width modulation signal with an operating voltage requirement of the item of merchandise.

7. A voltage regulator according to claim 1, further comprising a second feedback signal between an operating voltage node and the microprocessor.

8. A system for digitally controlling power to an item of merchandise electrically connected to an alarm sensor, the system comprising:
 a power cable extending between the alarm sensor and the item of merchandise;
 a regulated voltage source in electrical communication with the power cable;
 a reference resistor connected to the regulated voltage source and generating a reference voltage;
 a microprocessor in electrical communication with the power cable and the reference resistor, wherein the microprocessor identifies the power cable by measuring the reference voltage and calculating a corresponding resistance of the power cable;
 a power conversion chip electrically connected between the microprocessor and the power cable configured to provide an operating voltage to the item of merchandise;
 a first feedback signal transmitted from the power cable to the power conversion chip; and
 a correction signal generated by the microprocessor for encoding the voltage of the first feedback signal to provide power to the item of merchandise according to the corresponding resistance of the power cable.

9. A system according to claim 8, wherein the microprocessor comprises a computer readable medium storing a first look-up table that lists a plurality of the power cables by corresponding resistance values and further lists a plurality of output voltage requirements by corresponding resistance values.

10. A system according to claim 8, wherein the correction signal is a pulse width modulation signal.

11. A system according to claim 10, wherein the microprocessor comprises a computer readable medium storing a second look-up table that lists a plurality of output voltage requirements by corresponding duty cycle adjustments to the pulse width modulation signal.

12. A system for digitally controlling power to an item of merchandise electrically connected to an alarm sensor, the system comprising:
 a power cable extending between the alarm sensor and the item of merchandise;
 a microprocessor in electrical communication with the power cable;
 a regulated voltage source in electrical communication with the microprocessor;
 wherein the microprocessor is configured to: (i) calculate a voltage drop across the power cable; (ii) access a look-up table of power cable identifying information stored on the microprocessor; and (iii) continuously maintain the appropriate power to the item of merchandise according to an identified one of a plurality of the power cables.

13. A system according to claim 12, further comprising
 a power conversion chip in electrical communication with the microprocessor and the power cable; and
 a pulse width modulation signal transmitted from the microprocessor to the power conversion chip for continuously adjusting an operating voltage from the power conversion chip.

14. A system according to claim 13, further comprising a summation node connecting the pulse width modulation signal to a first feedback signal from the power cable.

15. A system according to claim 14, wherein pulse width modulation data is adjusted in the microprocessor via a second feedback signal configured for monitoring the operating voltage of the power conversion chip.

16. A system according to claim 12, wherein the power conversion chip provides a constant operating voltage within a predetermined range of a voltage drop across the power cable.

17. A method for regulating an operating voltage in a power circuit providing power to an item of merchandise electrically connected to a security device, the method comprising:
 identifying an operating voltage set point for the item of merchandise;
 measuring a real time operating voltage via a feedback loop;
 generating a correction signal that is correlated to the operating voltage set point and the real time operating voltage;
 adjusting an input to the feedback loop with the correction signal.

18. A method according to claim 17, wherein the correction signal is a pulse width modulation signal.

19. A method according to claim 17, further comprising identifying the operating voltage set point by identifying an input resistance of a load powering the item of merchandise.

20. A method according to claim 19, further comprising associating the input resistance of the load powering the item of merchandise with the correction signal that adjusts the input to the feedback loop.

21. A system according to claim 12, wherein the microprocessor comprises a computer readable medium storing the first look-up table, the first look-up table listing a plurality of the power cables by corresponding resistance values and a plurality of output voltage requirements by corresponding resistance values.

22. A method according to claim 17, further comprising continuously monitoring the operating voltage via a second feedback loop, wherein generating the correction signal comprises generating the correction signal based on the operating voltage monitored via the second feedback loop.

23. A method according to claim 17, further comprising identifying an input resistance of a load powering the item of merchandise, wherein generating a correction signal comprises accessing a look-up table comprising a plurality of correction signals and operating voltages for each input resistance of a load powering the item of merchandise.

* * * * *